(12) United States Patent
Wang et al.

(10) Patent No.: US 12,101,563 B2
(45) Date of Patent: Sep. 24, 2024

(54) IMAGE SENSOR AND DATA PROCESSING FOR PARALLEL FRAME CAPTURE IN HIGH DYNAMIC RANGE (HDR) PHOTOGRAPHY

(71) Applicant: QUALCOMM Incorporated, San Diego, CA (US)

(72) Inventors: Jing Wang, Milpitas, CA (US); Jiafu Luo, Irvine, CA (US); Silei Ma, San Diego, CA (US); Xiaoyun Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 17/456,117

(22) Filed: Nov. 22, 2021

(65) Prior Publication Data

US 2023/0164447 A1 May 25, 2023

(51) Int. Cl.
*H04N 23/741* (2023.01)
*H04N 23/73* (2023.01)
*H04N 25/585* (2023.01)

(52) U.S. Cl.
CPC ........... *H04N 23/741* (2023.01); *H04N 23/73* (2023.01); *H04N 25/585* (2023.01)

(58) Field of Classification Search
CPC .... H04N 23/741; H04N 23/73; H04N 25/585; H04N 25/59; H04N 25/46; H04N 25/134; H04N 25/445
See application file for complete search history.

(56) References Cited

U.S. PATENT DOCUMENTS

| | | |
|---|---|---|
| 2006/0139470 A1 | 6/2006 | McGowan |
| 2015/0201139 A1 | 7/2015 | Funatsu et al. |
| 2018/0209842 A1 | 7/2018 | Komori et al. |
| 2021/0358993 A1 | 11/2021 | Mao et al. |

OTHER PUBLICATIONS

Partial International Search Report—PCT/US2022/078441—ISA/EPO—Feb. 13, 2023.
International Search Report and Written Opinion—PCT/US2022/078441—ISA/EPO—Apr. 11, 2023.

*Primary Examiner* — Twyler L Haskins
*Assistant Examiner* — Angel L Garces-Rivera
(74) *Attorney, Agent, or Firm* — QUALCOMM Incorporated

(57) ABSTRACT

This disclosure provides systems, methods, and devices for image signal processing that support improved detail keeping in photography through increased dynamic range and/or highlight-keeping. The image signal processing may be performed on data received from a split-pixel image sensor with two sets of sensor elements with different sensitivities. The image signal processing may include receiving image data comprising: first data from a first set of sensor elements and second data from a second set of sensor elements capturing a representation of the scene with a different sensitivity that the first set of sensor elements; determining an output dynamic range for an output image frame; and determining an output image frame based on at least one of the first data and the second data and based on the output dynamic range. Other aspects and features are also claimed and described.

30 Claims, 10 Drawing Sheets

IMAGE SENSOR AND DATA PROCESSING FOR PARALLEL FRAME CAPTURE IN HIGH DYNAMIC RANGE (HDR) PHOTOGRAPHY

TECHNICAL FIELD

Aspects of the present disclosure relate generally to image processing. Some features may enable and provide improved image processing, including image with increased image detail and/or dynamic range.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

Dynamic range may be important to image quality when capturing a representation of a scene with a wide color gamut using an image capture device. Conventional image sensors have a limited dynamic range, which may be smaller than the dynamic range of human eyes. Dynamic range may refer to the light range between bright portions of an image and dark portions of an image. A conventional image sensor may increase an exposure time to improve detail in dark portions of an image at the expense of saturating bright portions of an image. Alternatively, a conventional image sensor may decrease an exposure time to improve detail in bright portions of an image at the expense of losing detail in dark portions of the image. Thus, image capture devices conventionally balance conflicting desires, preserving detail in bright portions or dark portions of an image, by adjusting exposure time. High dynamic range (HDR) photography improves photography using these conventional image sensors by combining multiple recorded images from the image sensor. These recording images are recorded in series, one after another, and then combined. However, the serial recording of images results in ghosting or mismatch between the recording image frames that decreases the quality of the HDR photography obtained by combining the recorded image frames.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

An image sensor may be configured to record image frames with different sensitivities such that the image frames may be combined to produce a photography with improved quality. The improved quality may be observed through higher detail in one or more highlight regions and/or dark regions. The image sensor configuration may include a first set of sensor elements with a first sensitivity and a second set of sensor elements with a second sensitivity different from the first sensitivity. The first set of sensor elements may capture a first representation of a scene at the first sensitivity; and the second set of sensor elements may capture a second representation of the scene at the second sensitivity. One such image sensor configuration is described in embodiments below as a split-pixel image sensor, however other image sensor configurations may be used to obtain the first and second sensitivities. The different sensitivities within a single image sensor may allow recording first data and second data in at least partially overlapping times. An output image frame for photography may be determined from at least one of the first data and second data, and in some embodiments from both the first data and the second data.

An image sensor according to embodiments of the disclosure with different sensitivities for recording to representations of the scene may be used to produce a standard dynamic range (SDR) photograph or a high dynamic range (HDR) photograph. A method for processing first data and second data captured at least partially in overlapping time periods from one or more sensors may include receiving, from the image sensor or from memory coupled to the image sensor, image data comprising first data and second data. The first data may be received from a first set of sensor elements capturing a first representation of a scene with a first sensitivity. The second data may be received from a second set of sensor elements capturing a second representation of the scene with a second sensitivity different from the first sensitivity. In some embodiments, the first data and the second data are captured in parallel from one image sensor with the first set of sensor elements having a different configuration than the second set of sensor elements, such as in the split-pixel image sensors described in embodiments of this disclosure.

In one aspect of the disclosure, a method for image processing includes receiving first data corresponding to a scene captured at a first sensitivity, the first data captured by a first set of sensor elements; receiving second data corresponding to the scene captured at a second sensitivity, the second data captured by a second set of sensor elements, wherein the first set of sensor elements and the second set of sensor elements form a uniform array of sensor elements configured in a color pattern comprising a color filter array (CFA) larger than a Bayer pattern; determining an output dynamic range for an output image frame; and determining an output image frame based on the output dynamic range and at least one of the first data and the second data.

In an additional aspect of the disclosure, an apparatus includes at least one processor and a memory coupled to the at least one processor. The at least one processor is configured to perform steps including receiving first data corresponding to a scene captured at a first sensitivity, the first data captured by a first set of sensor elements; receiving second data corresponding to the scene captured at a second sensitivity, the second data captured by a second set of sensor elements, wherein the first set of sensor elements and the second set of sensor elements form a uniform array of sensor elements configured in a color pattern comprising a color filter array (CFA) larger than a Bayer pattern; determining an output dynamic range for an output image frame; and determining an output image frame based on the output dynamic range and based on at least one of the first data and the second data.

In an additional aspect of the disclosure, an apparatus includes means for receiving first data corresponding to a scene captured at a first sensitivity, the first data captured by a first set of sensor elements; means for receiving second data corresponding to the scene captured at a second sensitivity, the second data captured by a second set of sensor elements, wherein the first set of sensor elements and the second set of sensor elements form a uniform array of sensor elements configured in a color pattern comprising a color filter array (CFA) larger than a Bayer pattern; means for determining an output dynamic range for an output image frame; and means for determining an output image frame based on the output dynamic range and based on at least one of the first data and the second data.

In a further aspect of the disclosure, an apparatus includes an image sensor comprising a first set of sensor elements and a second set of sensor elements, wherein the first set of sensor elements and the second set of sensor elements comprise a uniform array of sensor elements representing a color pattern of a color filter array (CFA) larger than a Bayer pattern; a memory storing processor-readable code and coupled to the image sensor; and at least one processor coupled to the memory and coupled to the image sensor, the at least one processor configured to execute the processor-readable code to cause the at least one processor to perform steps including recording into the memory first data and second data captured from the image sensor during at least partially overlapping times, the first data from the first set of sensor elements capturing a first representation of a scene with a first sensitivity and the second data from the second set of sensor elements capturing a second representation of the scene with a second sensitivity different from the first sensitivity; determining an output dynamic range for an output image frame; and determining an output image frame based on the output dynamic range and based on at least one of the first data and the second data.

In an additional aspect of the disclosure, a non-transitory computer-readable medium stores instructions that, when executed by a processor, cause the processor to perform operations. The operations include receiving first data corresponding to a scene captured at a first sensitivity, the first data captured by a first set of sensor elements; receiving second data corresponding to the scene captured at a second sensitivity, the second data captured by a second set of sensor elements, wherein the first set of sensor elements and the second set of sensor elements form a uniform array of sensor elements configured in a color pattern comprising a color filter array (CFA) larger than a Bayer pattern; determining an output dynamic range for an output image frame; and determining an output image frame based on the output dynamic range and at least one of the first data and the second data.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving digital cameras having image sensors and image signal processors (ISPs). The ISP may be configured to control the capture of image frames from one or more image sensors and process one or more image frames from the one or more image sensors to generate a view of a scene in a corrected image frame. A corrected image frame may be part of a sequence of image frames forming a video sequence. The video sequence may include other image frames received from the image sensor or other images sensors and/or other corrected image frames based on input from the image sensor or another image sensor. In some embodiments, the processing of one or more image frames may be performed within the image sensor, such as in a binning module. The image processing techniques described in embodiments disclosed herein may be performed by circuitry, such as a binning module, in the image sensor, in the image signal processor (ISP), in the application processor (AP), or a combination or two or all of these components.

In an example, the image signal processor may receive an instruction to capture a sequence of image frames in response to the loading of software, such as a camera application, to produce a preview display from the image capture device. The image signal processor may be configured to produce a single flow of output frames, based on images frames received from one or more image sensors. The single flow of output frames may include raw image data from an image sensor, binned image data from an image sensor, or corrected image frames processed by one or more algorithms, such as in a binning module, within the image signal processor. For example, an image frame obtained from an image sensor, which may have performed some processing on the data before output to the image signal processor may be processed in the image signal processor by processing the image frame through an image post-processing engine (IPE) and/or other image processing circuitry for performing one or more of tone mapping, portrait lighting, contrast enhancement, gamma correction, etc.

After an output frame representing the scene is determined by the image signal processor using the image correction, such as binning described in various embodiments herein, the output frame may be displayed on a device display as a single still image and/or as part of a video sequence, saved to a storage device as a picture or a video sequence, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, frames for object tracking, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations.

In some aspects, the corrected image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
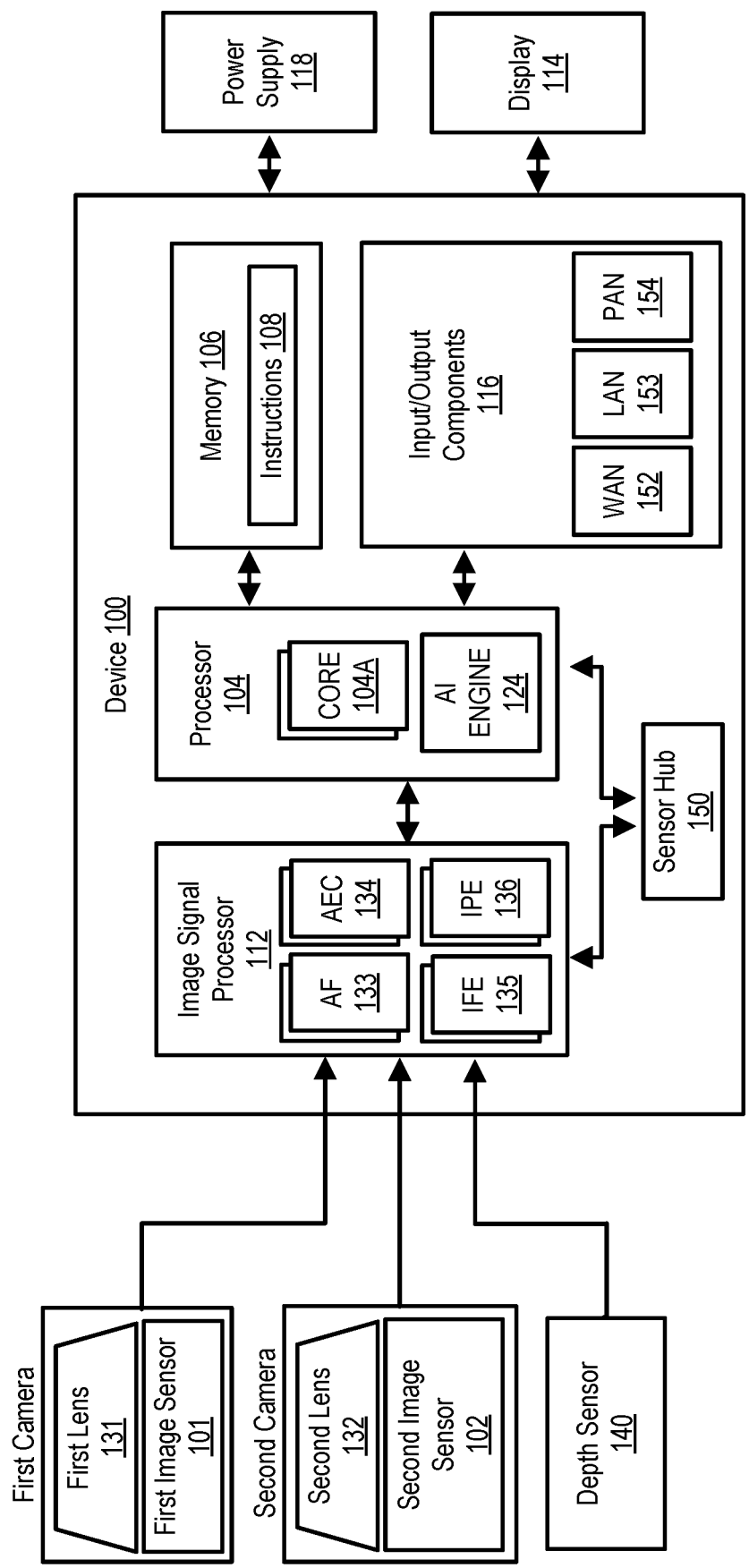
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support image capture and/or image processing. For example, an image sensor may be configured to record image frames with different sensitivities such that the image frames may be combined to produce a photography with improved quality. The improved quality may be observed through higher detail in one or more highlight regions and/or dark regions. The image sensor configuration may include a first set of sensor elements with a first sensitivity and a second set of sensor elements with a second sensitivity different from the first sensitivity. The first set of sensor elements may capture a first representation of a scene at the first sensitivity; and the second set of sensor elements may capture a second representation of the scene at the second sensitivity.

Particular implementations of the subject matter described in this disclosure may be implemented to realize one or more of the following potential advantages or benefits. In some aspects, the present disclosure provides techniques for achieving high dynamic range (HDR) photography with reduced motion artifacts. Forming HDR images from image data captured in parallel from a single image sensor, such as a split-pixel image sensor described in embodiments of this disclosure, may reduce motion artifacts. The exposure time for different sensor elements in the image sensor may be the same to further reduce motion artifacts. In some embodiments, a circuit configuration for the sensor elements may include a capacitance that provides higher dynamic range without using different exposure time for the different sensor elements. The image sensor configuration and processing described in techniques of this disclosure can still support in sensor zoom, binning, and other SDR photography processing techniques by allowing different processing of the image data output from the image sensor to produce different output frames.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. One or more of the image sensors may include a reconfigurable binning module. Additionally or alternatively, one or more of the image signal processors (ISPs) may include a reconfigurable binning module. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons. I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is a IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

The first camera may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), and or one or more auto exposure compensation (AEC) 134 engines. The AF 133, AEC 134, AFE 135, APE 136 may each include application-specific circuitry, be embodied as software code executed by the ISP 112, and/or a combination of hardware within and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including binning operations. For example, execution of the instructions can instruct the image signal processor 112 to begin or end capturing an image frame or a sequence of image frames, in which the capture includes binning as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video comprising a sequence of image frames is captured and processed from one or more image sensors 101 or 102. Image correction, such as with cascaded IPEs, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands to specify an output dynamic range) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Figure 2:
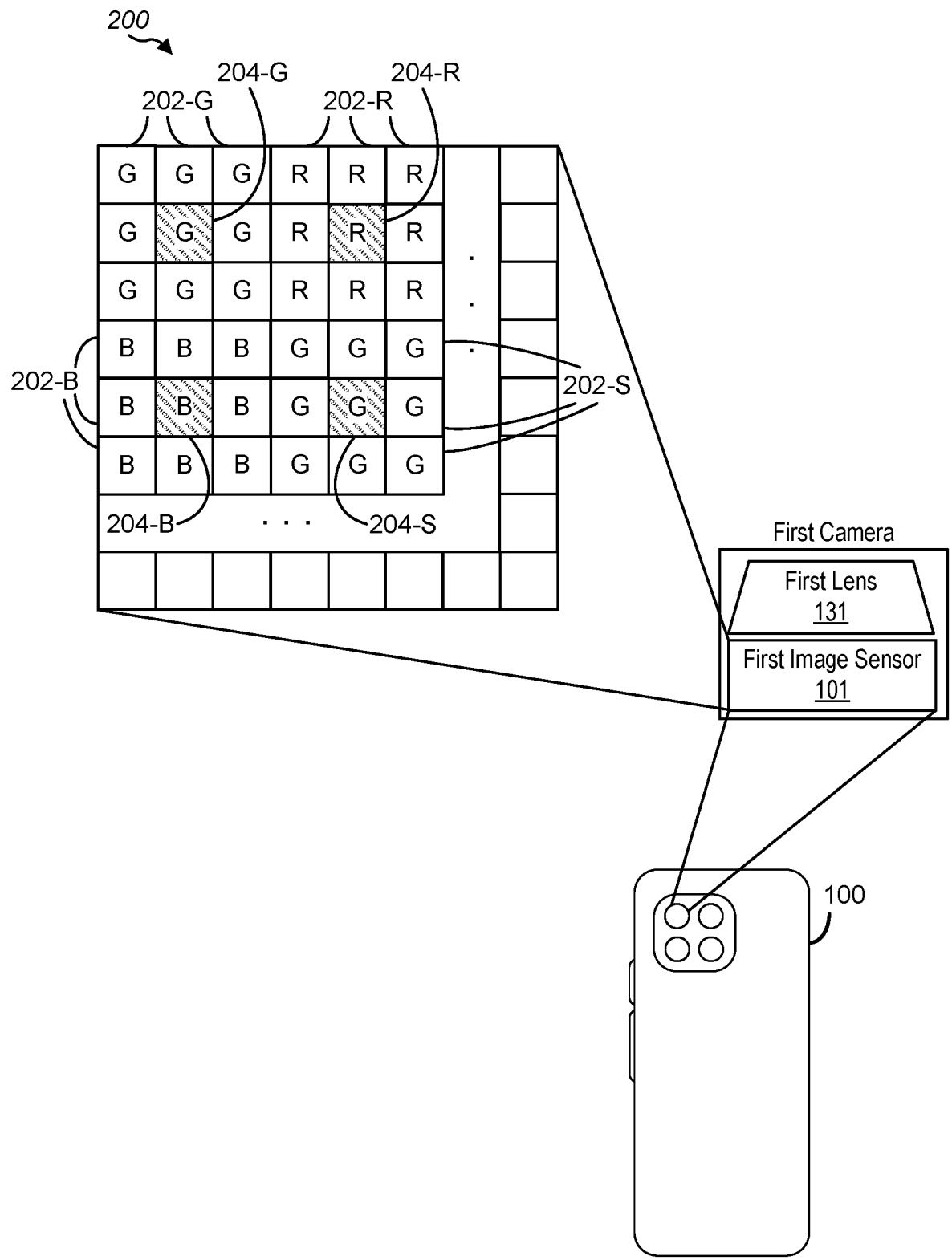
FIG. 2 shows an image capture device with a split-pixel image sensor design according to some embodiments of the disclosure.

FIG. 2 shows an image capture device with a split-pixel image sensor design according to some embodiments of the disclosure. An image capture device 100 may have one or more cameras, including a first camera with a first image sensor 101. Light reflected by a scene is represented by photons collated by the first lens 131 and directed to the first image sensor 101. The first image sensor 101 includes sensor elements that convert light, represented by photons, into electrical signals, such as charge-coupled devices (CCDs) or active-pixel devices (e.g., complimentary metal-oxide-semiconductor (CMOS) devices). The first image sensor 101 may include an array of many of these sensor elements. Separate colors in a scene may be detected by including a color filter over each of the sensor elements, such that each sensor element measures an intensity of a particular color at a particular location in the scene. The sensor elements and color filters may be organized into a particular cell size that is repeated across a larger size. Each of the sensor elements may be part of a uniform array 200 of sensor elements, in which each sensor element has the same surface area exposed for receiving light. The uniform sensor array may have groups of sensor elements that collectively form a color filter array (CFA) pattern that is larger than a Bayer pattern.

As one example, image sensor 101 may include a color filter array (CFA) 200 including sensor elements 202-G, 202-R, 202-B, 204-G, 204-R, and 204-B. Green sensor elements 202-G and 204-G may be organized in a 3×3 array; red sensor elements 202-R and 204-R may be organized in a 3×3 array; and blue sensor elements 202-B and 204-B may be organized in a 3×3 array. The green, blue, and red arrays may be organized into a 6×6 array in which a top-left quadrant includes green image sensors 202-G and 204-G, a top-right quadrant includes red sensor elements 202-R and 204-R, a bottom-left quadrant includes blue sensor elements 202-B and 204-B, and a bottom-right quadrant includes green sensor elements 202-S and 204-S. Although FIG. 2 illustrates one example color filter array (CFA) configuration with, for example, a 3×3 array for each color and a 6×6 cell that is repeated across the image sensor 200, other configurations for the color filter array (CFA) may be used. In some embodiments, sensor elements 204-G, 204-R, 204-B, and 204-S may have associated neutral density filters that reduce the intensity of light reaching elements 204-G, 204-R, 204-B, and 204-S, such that elements 204 have a lower sensitivity than elements 202. In some embodiments, all sensor elements may have a neutral density filter, but a stronger filter is associated with sensor elements 204-G, 204-R, 204-B, and 204-S. Alternative CFA arrays for a split-pixel design according to some embodiments are shown in FIGS. 3A-3D.

Read-out from the color filter array (CFA) may combine photons collected from multiple sensor elements within CFA 200 to obtain pixel values for an image frame representing the scene. Some elements, such as some neighboring border elements in a quadrant, may be combined into a large pixel group, with photons collected by the elements in the pixel group summed or otherwise combined to generate a pixel value for an image frame. For example, eight green sensor elements 202-G in the top-left quadrant may be combined to obtain a first green pixel value. Some elements, such as center green element 204-G in a quadrant, may be separately read out as a small pixel group to obtain a second green pixel value with a different sensitivity. Likewise, eight red sensor elements 202-R in the top-right quadrant may be combined to obtain a first red pixel value and center red element 204-R may be read out to obtain a second red pixel; eight blue sensor elements 202-B in the bottom-left quadrant may be combined to obtain a first blue pixel value and center blue element 204-B may be read out to obtain a second blue pixel; and eight green sensor elements 202-S in the bottom-right quadrant may be combined to obtain a third green pixel value and center green element 204-S may be read out to obtain a fourth green pixel value.

The different pixel values may be used to form image frames. The large pixel group and small pixel group of the split-pixel configuration provide different sensitivities and thus provide the equivalent of different exposure times. The different pixel values may be combined in different image processing techniques to obtain representations of a scene with different characteristics, such as a standard dynamic range (SDR) or a high dynamic range (HDR) image. For example, an HDR image frame may be determined as a combination of a first image frame based on elements 202 and second image frames based on elements 204, in which the first image frame is determined from the first green pixel value, the first red pixel value, the first blue pixel value, and the third green pixel value and the second image frame is determined from the second green pixel value, the second red pixel value, the second blue pixel value, and the fourth green pixel value. The first and second image frames may represent the scene at two different equivalent exposure times, allowing the determination of a HDR image frame with higher dynamic range than either of the first or second image frames.

Conventional HDR image sensors use different exposure times to obtain the first and second image frames for combining into an HDR image frame. However, the different exposure times lead to motion artifacts in the combined HDR image frame because of the different level of motion blur introduced by different exposure times. A split-pixel image sensor, such as describe in FIG. 2 and other embodiments herein, allows determination of a combined HDR image frame from image frames with the same exposure time but different number of sensor elements leading to different sensitivities. Each element of the CFA array 200 may be operated with the same exposure time, such that each of the large pixel groups (e.g., green sensor elements 202-G) and small pixel groups (e.g., green sensor elements 204-G) are exposed to the same scene and do not suffer from the same motion blur as conventional HDR sensors. In some embodiments, the large pixel group and small pixel group may be operated at different exposure times to further increase a dynamic range of a combined HDR image frame determined from a first image frame based on the large pixel group and from a second image frame based on the small pixel group.

Additional split-pixel sensor designs for different CFA patterns are shown in FIGS. 3A, FIG. 3B, FIG. 3C, and FIG. 3D.

Figure 3A:
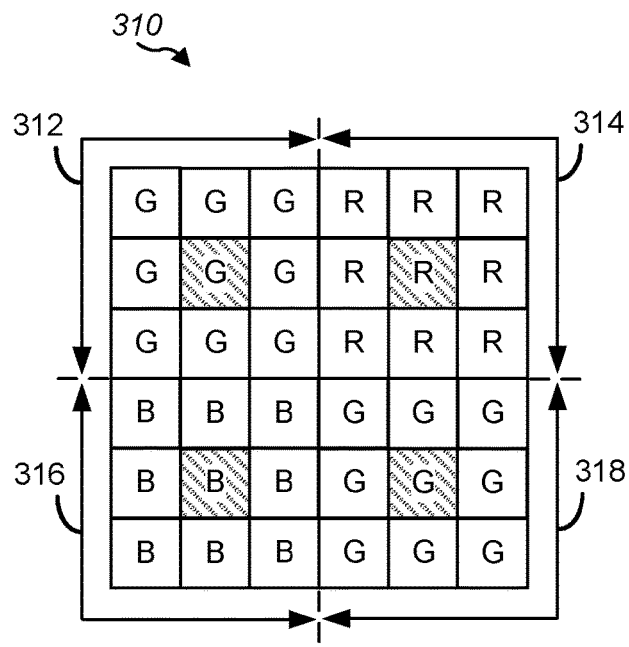
FIG. 3A shows a split-pixel image sensor design for a 3×3 color filter array (CFA) pixel configuration according to some embodiments of the disclosure.

FIG. 3A shows a split-pixel image sensor design for a 3×3 color filter array (CFA) pixel configuration according to some embodiments of the disclosure. A CFA array 310 includes a first quadrant 312 of a 3×3 array of sensor elements with the perimeter sensor elements forming a large pixel group and the center sensor element forming a small pixel group. Quadrants 314, 316, and 318 are similarly configured as the first quadrant 312 with large pixel groups and small pixel groups.

Figure 3B:
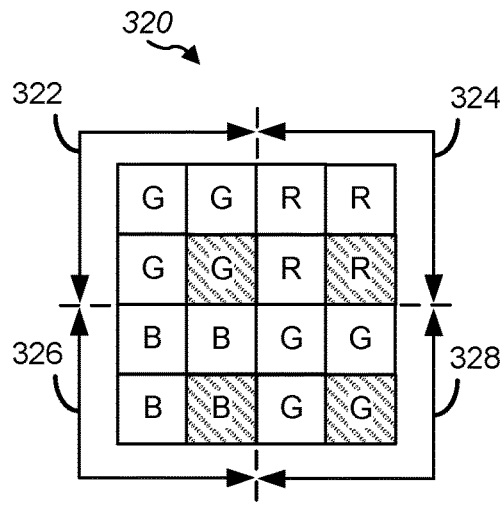
FIG. 3B shows a split-pixel image sensor design for a 2×2 color filter array (CFA) pixel configuration according to some embodiments of the disclosure.
Figure 3C:
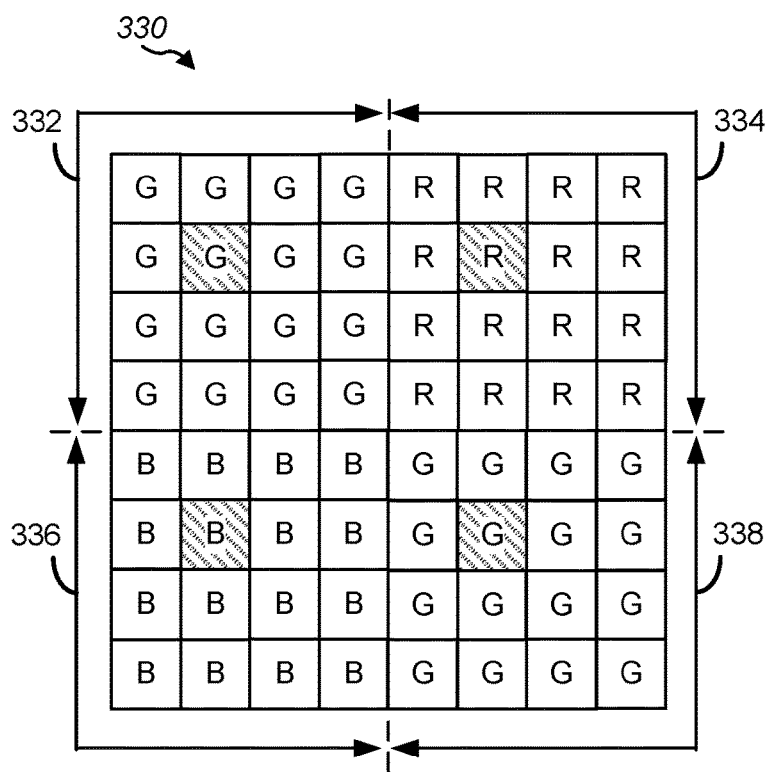
FIG. 3C shows a split-pixel image sensor design for a 4×4 color filter array (CFA) pixel configuration according to some embodiments of the disclosure.
Figure 3D:
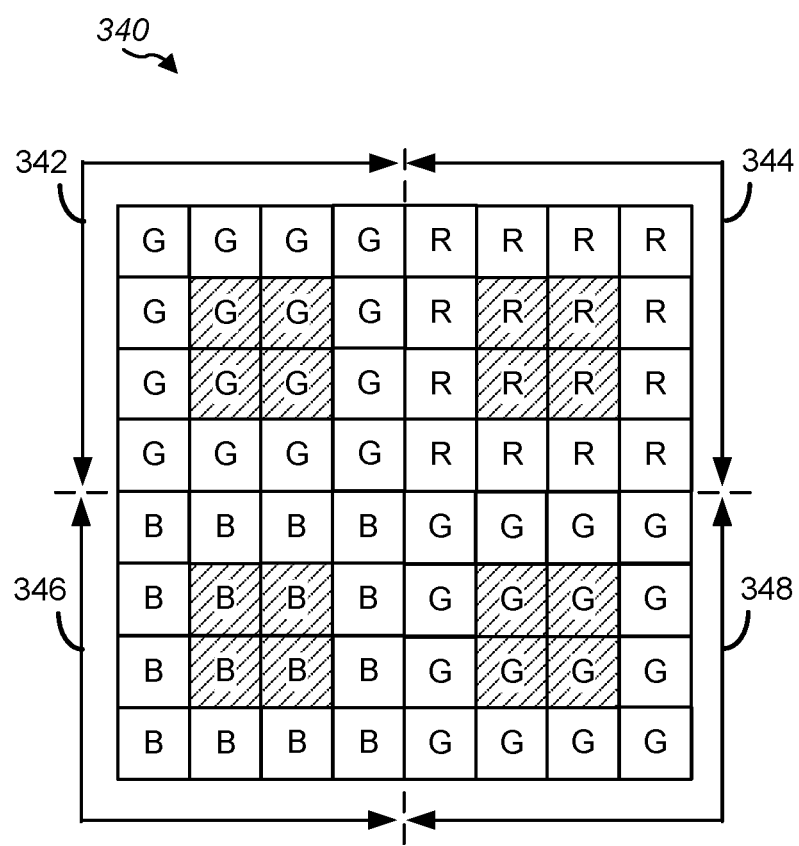
FIG. 3D shows a split-pixel image sensor design for a 4×4 color filter array (CFA) pixel configuration according to some embodiments of the disclosure.

Embodiments of the disclosure may have different size CFAs than the 3×3 array of FIG. 3A, such as a 2×2 array size as shown in FIG. 3B or a 4×4 array size as shown in FIG. 3C and FIG. 3D. FIG. 3B shows a split-pixel image sensor design for a 2×2 color filter array (CFA) pixel configuration according to some embodiments of the disclosure. A CFA array 320 includes a first quadrant 322 of a 2×2 array of sensor elements with the top and left sensor elements forming a large pixel group and the bottom-right sensor element of the 2×2 array that is first quadrant 322 forming a small pixel group. Quadrants 324, 326, and 328 are similarly configured as the first quadrant 322. FIG. 3C shows a split-pixel image sensor design for a 4×4 color filter array (CFA) pixel configuration according to some embodiments of the disclosure. A CFA array 330 includes a first quadrant 332 of a 4×4 array of sensor elements with the 15 of the 4×4 sensor elements forming a large pixel group and one of the sensor elements forming a small pixel group. The single sensor element forming the small pixel group may be any one of the 16 sensor elements of the quadrant 332, such as the shaded element shown in quadrant 332 of FIG. 3C. Quadrants 334, 336, and 338 are similarly configured as the first quadrant 332 with large pixel groups and small pixel groups.

In some embodiments, the small pixel group may include multiple sensor elements, such as in the embodiment of FIG. 3D. FIG. 3D shows a split-pixel image sensor design for a 4×4 color filter array (CFA) pixel configuration according to some embodiments of the disclosure. A CFA array 340 includes a first quadrant 342 of a 4×4 array of sensor elements with the perimeter twelve sensor elements forming a large pixel group and the inner four sensor elements forming a small pixel group. Quadrants 344, 346, and 348 are similarly configured as the first quadrant 342. Although each of the quadrants of a repeating cell shown in FIGS. 3A-3D are shown as similarly configured, the quadrants may have different configurations, such as when different configurations for different colors is appropriate. Further, although each of the CFA arrays of FIGS. 3A-3D are shown with similar G-R-B-G color filter arrangements, the color filters may be differently configured, such as with two blue or two red quadrants or with RGB color filters interspersed throughout a CFA array.

Figure 4:
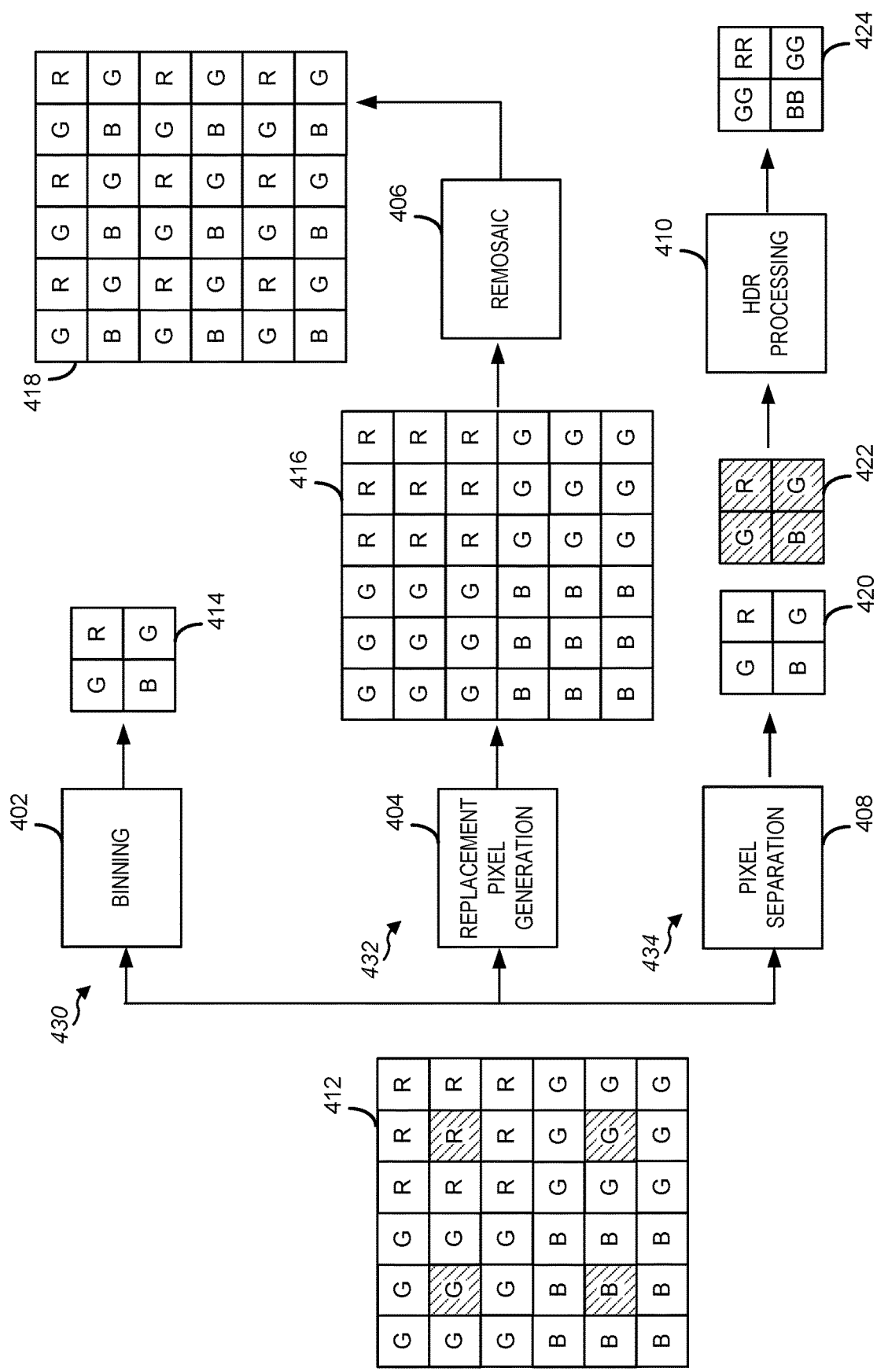
FIG. 4 shows a block diagram for image processing techniques with a 3×3 color filter array (CFA) pixel configuration according to some embodiments of the disclosure.

Regardless of the configuration of a CFA array with different large pixel groups and small pixel groups, the large and small pixel groups may be combined or not combined to determine output frames determined appropriate for the scene or determined based on a user input. Different techniques for determining output image frames are shown in FIG. 4. FIG. 4 shows a block diagram for image processing techniques with a 3×3 color filter array (CFA) pixel configuration according to some embodiments of the disclosure. A CFA array 412 may generate raw data as a series of sensor values read from the individual sensor elements of the CFA array 412. The raw data may be processed in one or more of the processing paths 430, 432, and/or 434.

A first processing path 430 determines a non-HDR output image frame. The path 430 includes a binning block 402 that is configured to perform eight-pixel binning on the values of CFA array 412. The small pixel groups may be discarded in the first processing path 430 reducing the CFA array 412 to eight values in each quadrant of a cell of the CFA array 412. The eight values may be averaged or summed to obtain a single pixel value for each quadrant to reduce the 3×3 CFA array 412 to an output image frame 414 in a Bayer representation with the same dynamic range as that of the large pixel group of the CFA array 412. The output image frame 414 may have a lower resolution than the CFA array 412. The binning of block 402 may be matched to the configuration of CFA array 412. For example, if the input is a CFA array produced by a sensor such as the split-pixel image sensor of FIG. 3C, the binning of block 402 may be fifteen-pixel binning.

A second processing path 432 determines a non-HDR output image frame to capture a full resolution image or an image capture frame 418 with in-sensor zoom. As one example, a 108 MP sensor with a 3×3 configuration for sensor elements, in a binning mode, may produce a 12MP Bayer. In full resolution mode, remosaic block 406 generates a different image frame. In full resolution mode, the mosaic block 416 may receive three 108MP raw images and data frame 418 will be 108MP Bayer. In in-sensor zoom mode, we will only output 12MP 3×3 raw image frame 416, and image frame 418 will be 12MP Bayer. This 12MP Bayer will have ⅓ FOV of the binning mode 12MP Bayer, thus giving the name of in-sensor zoom. This technique may also be applied to sensor images operating at full resolution, or switchable between in-sensor zoom and in-sensor embodiment, The path 432 includes a replacement pixel generation module 404 that is configured to generate replacement data to replace small pixel group values with values determined from the large pixel group values to determine an intermediate image frame 416. The intermediate image frame 416 is processed in remosaic module 406, which determines output image frame 418 in a remosaic Bayer pattern with the same dynamic range as that of the large pixel group of the CFA array 412. The output image frame 418 may have a resolution that matches that of the CFA array 412.

A third processing path 434 determines a HDR output frame by combining the large pixel group and small pixel group values from the CFA array 412. The CFA array 412 values are input to a pixel separation module 408 to determine a first image frame 420 in a Bayer pattern from the large pixel group and to determine a second image frame 422 in a Bayer pattern from the small pixel group. An HDR processing module 410 may receive the image frames 420 and 422, which are different representations of a scene captured at different equivalent exposure times and determine an HDR output frame 424 based on tone mapping using the image frames 420 and 422. The HDR output image frame 424 may be a lower resolution than the CFA array 412.

Figure 5:
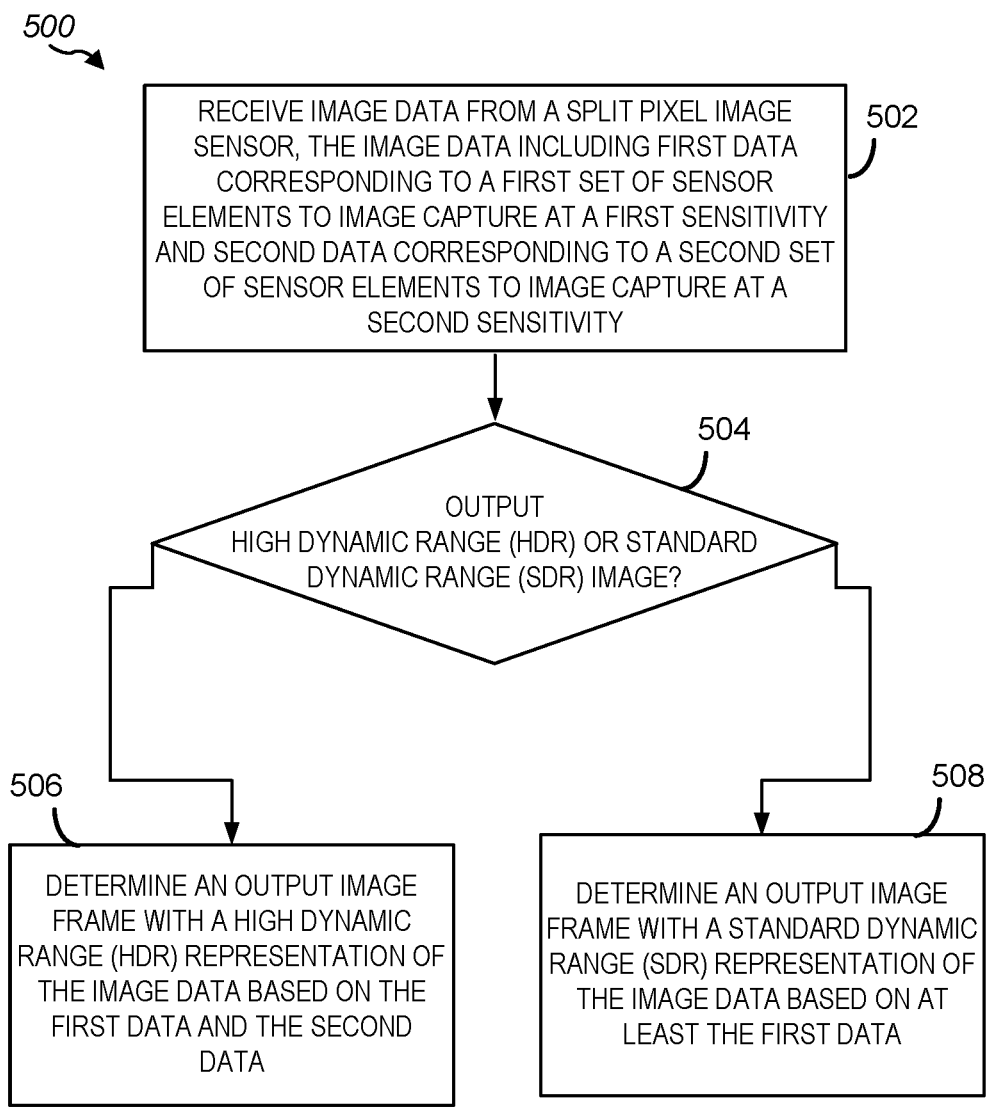
FIG. 5 shows a flow chart illustrating a method for processing image data from a split-pixel image sensor according to some embodiments of the disclosure.

The determination of which processing path of FIG. 4 to execute for a received CFA array may be based on whether an image capture device is configured to determine an HDR output image frame or a SDR output image frame. A method 500 for processing raw data from a CFA array is shown in FIG. 5. FIG. 5 shows a flow chart illustrating a method for processing image data from a split-pixel image sensor according to some embodiments of the disclosure. A method 500 includes, at block 502, receiving image data, the image data including first data corresponding to a first set of sensor elements (e.g., a large pixel group) capturing a first representation of a scene with a first sensitivity. The image data may also include second data corresponding to a second set of sensor elements (e.g., a small pixel group) capturing a second representation of the scene with a second sensitivity different from the first sensitivity of the first set of sensor elements. For example, the second set of sensor elements may have neutral density filters, different capacitances, and/or different exposure times. In some embodiments, the first data and the second data may be captured in parallel from one image sensor. In some embodiments, the image data is received from a split-pixel image sensor with a color filter array (CFA) configuration such as shown in FIGS. 3A-3D. The image data may be received by an image signal processor or processor, such as ISP 112 or processor 104 of FIG. 1, from one or more image sensors, such as image sensors 101, 102, and/or 140 of FIG. 1.

At block 504, a dynamic range for an output image frame is determined, such as whether the output image frame is configured to be a high dynamic range (HDR) or standard dynamic range (SDR) image frame. The determination of the output dynamic range may be based on user input, such as by allowing a user in a camera application to select SDR or HDR for output. The determination of the output dynamic range may also or alternatively be based on a system default. The determination of the output dynamic range may also or alternatively be based on analysis of the image data, such as to determine whether the image data has a wide color gamut above a threshold range of colors indicating that the scene benefits from an HDR representation. The determination of the output dynamic range may also or alternatively be based on analysis of a previous image frame, such as whether the same or similar scene was recently represented in an HDR or SDR image frame. The determination may be performed by an ISP or processor, such as ISP 112 or processor 104 of FIG. 1, based on stored settings in memory 106 and/or input received through components 116.

If the output dynamic range is determined to be a HDR representation, the method 500 continues to block 506. If the output dynamic range is determined to be a SDR representation, the method continues to block 508. Although two outcomes are shown from decision block 504, other outcomes may be possible, for example, by applying multiple threshold levels to the output dynamic range. For example, different processing may be performed based on whether the output dynamic range is determined to be a 8-bit, 9-bit, or 10-bit representation.

At block 506, when the output dynamic range is a HDR representation, an output image frame with a HDR representation of the scene in the image data is determined based on the first data and the second data. That is, the output image frame for an HDR representation is based on first data, such as from a large pixel group of a split-pixel image sensor shown in FIGS. 3A-3D, and second data, such as from a small pixel group of a split-pixel image sensor shown in FIGS. 3A-3D. The first and second data from different pixel groups may be representations of a scene with different sensitivities to light, such as by having different exposure times or different filter strengths or different capacitances. Combining the first data and second data may produce an output image frame with a higher dynamic range than a first dynamic range of the first data and a higher dynamic range than a second dynamic range of the second data. The processing at block 506 may be the processing represented in processing path 434 of FIG. 4 with the output image frame corresponding to HDR output frame 424. The processing corresponding to block 506, such as represented in the processing path 434, may be performed by an image signal processor, such as ISP 112 of FIG. 1, by a processor, such as processor 104 of FIG. 1, or a combination of ISP 112 and processor 104.

At block 508, when the output dynamic range is a SDR representation, an output image frame with a SDR representation of the scene in the image data is determined based on at least the first data. In some embodiments, the output image frame may be based only on the first data, such as by discarding the second data and/or some of the first data. For example, the SDR representation may be generated by binning the first data and discarding the second data. In this example, the processing at block 508 may be the processing represented in processing path 430 of FIG. 4 with the output image frame corresponding to output frame 414. As another example, the SDR representation may be generated by filling missing values in the first data by using replacement pixel generation and remosaicing the resulting data. In this example, the processing at block 508 may be the processing represented in processing path 432 of FIG. 4 with the output image frame corresponding to output frame 418. The determination of whether to perform processing according to path 430 or 432 may be based on a required resolution of zoom level set for the image capture device. The processing corresponding to block 508, such as represented in the processing path 430 or 432, may be performed by an image signal processor, such as ISP 112 of FIG. 1, by a processor, such as processor 104 of FIG. 1, or a combination of ISP 112 and processor 104. In some embodiments, determination of the output image frame with the SDR representation may be based additionally on the second data, such as by adjusting highlight regions in the first data based on corresponding portions of the second data.

Figure 6A:
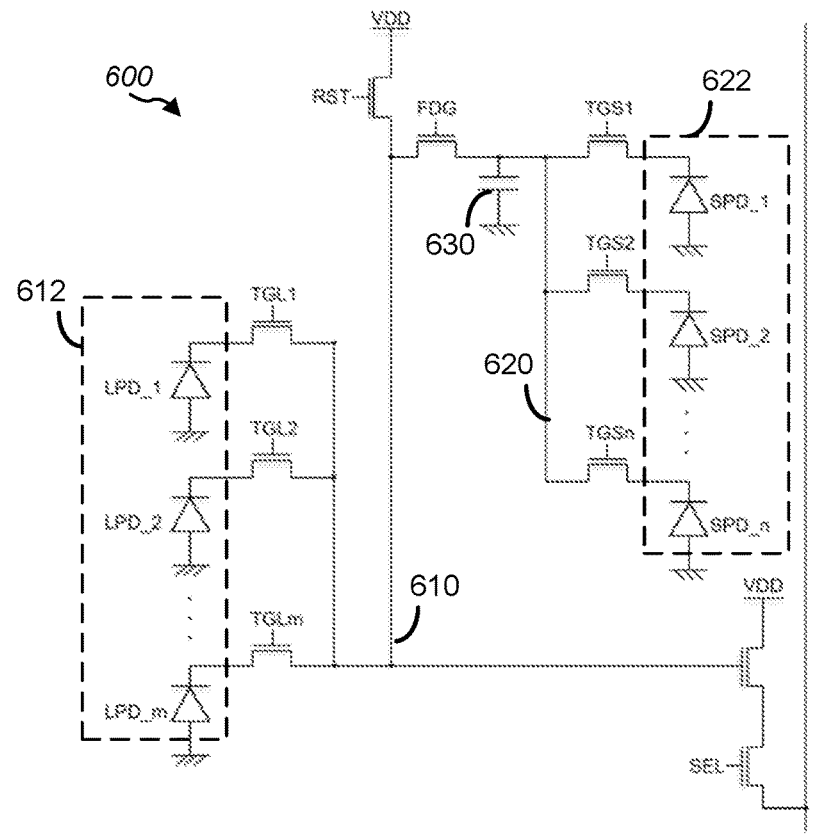
FIG. 6A shows a circuit diagram for a split-pixel image sensor according to some embodiments of the disclosure.

A split-pixel image sensor with different sensitivities between different groups of pixels within the image sensor may be achieved in one embodiment with a circuit arrangement for sensor elements illustrated in FIG. 6A. FIG. 6A shows a circuit diagram for a split-pixel image sensor according to some embodiments of the disclosure. A circuit 600 may include two separate floating nodes, with a first floating node 610 shared by a first group 612 of sensor elements (such as the large pixel group) and a second floating node 620 shared by a second group 622 of sensor elements (such as the small pixel group). The first group 612 of elements may have m elements, and the second group 622 of elements may have n elements. Each of the m elements and n elements may have corresponding access transistors TL1-TLm and TGS1-TGSn, respectively, with a configurable path comprising at least the transistor gate FDG configured to couple the floating gate nodes 610 and 620 of the groups 612 and 622. When the elements are arranged as shown in, for example, FIG. 3A, m=8 and n=1. When the elements are arranged a shown in, for example, FIG. 3D, m=8 and n=4. The second floating node 620 corresponding to the second group 622 may be configured with a large enough full-well capacity to allow high dynamic range. In some embodiments, a capacitor 630 may be added to the floating node 620 to further increase dynamic range.

Different sensitives between groups of pixels within the image sensor may be achieved in other embodiments through other features or combinations of features. For example, a neutral density (ND) filter may be applied on some of the pixels such that some incoming light is blocked resulting in a requirement of more light to saturate (e.g., a "full well equivalent brightness") the sensor elements for pixels with ND filters. A split-pixel image sensor may use a combination of different capacitances and/or ND filters to obtain different sensitivities between groups of pixels. In some embodiments, full well capacity (FWC) may be determined in part by a voltage swing at nodes 610 and/or 620. The voltage swing may be controlled through additional capacitance in capacitor 630, such that the FWC is adjusted to change the sensitivity. In some embodiments, a lateral over-flow integrated capacitor (LOFIC) may be used to further increase FWC, in which during exposure, the TGS1-$n$ pixels are partially open such that any extra charge collected by SPD1-SPDn overflow into capacitor 630. In some embodiments, sensitivity may be changed additionally or alternatively by controlling different groups of pixels with different exposure times.

Figure 6B:
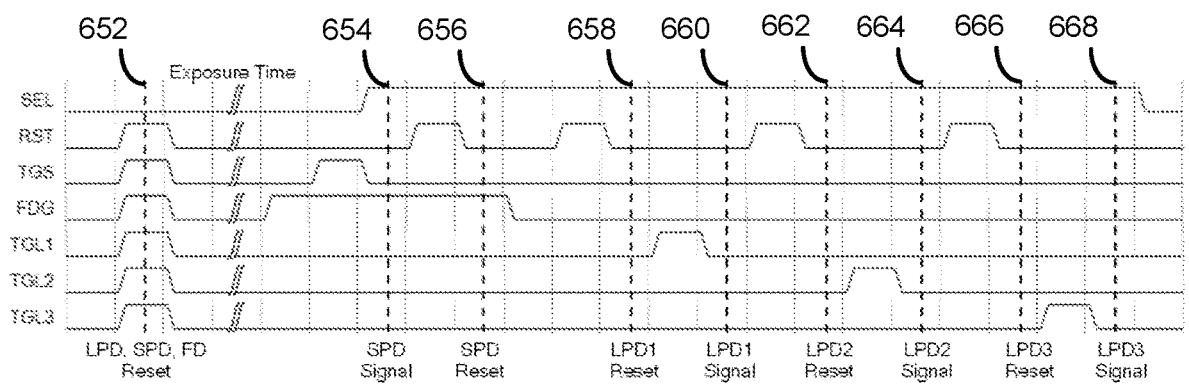
FIG. 6B shows a timing diagram for reading out a split-pixel image sensor according to some embodiments of the disclosure.

A timing diagram for reading out the elements in a configuration such as FIG. 6A is shown in FIG. 6B. FIG. 6B shows a timing diagram for reading out a split-pixel image sensor according to some embodiments of the disclosure. The diagram of FIG. 6B is simplified to show a configuration with three elements (LPD1, LPD2, LPD3 with corresponding TGL1, TGL2, and TGL3 access signals) in first group 612 and one element (SPD with corresponding TGS access signal) in second group 622, such as with the 2×2 color filter array (CFA) configuration of FIG. 3B. However, similar timing diagrams may be used to operate different configurations of image elements. At time 652, a reset occurs prior to a desired beginning of an image capture by exposure of the elements to light reflected from the scene. First, the small pixel group is read out. At time 654, a SPD signal is read, followed by a SPD reset at time 656. Next, the large pixel group is read out. At time 658, a LPD1 reset occurs, followed by a LPD1 signal read at time 660. At time 662, a LPD3 reset occurs, followed by a LPD2 signal read at time 664. At time 666, a LPD3 reset occurs, followed by a LPD3 signal read at time 668.

Other timings may be used for controlling a split-pixel image sensor such as represented in the circuit of FIG. 6A. In some embodiments in which a ND filter is used, the SPD signal/reset can be read either before LPD or after. For example, after the FDG signal goes high then the RST signal may be set high to do a reset of nodes 610 and 620, followed by a read of the reset level of SPD, setting TGS to a high level, and then performing a second read of the SPD signal level. This or other timings may be used to perform a true correlated double-sample (CDS), which may yield lower noise in the resulting image. As another example, the FDG signal may be set high for readout of SPD reset and signal when the split-pixel image sensor includes capacitor 630 and FDG access transistor. As a further example involving an embodiment with a LOFIC, the timing of FIG. 6B can be shown, with a modification such that the TGS signal has a low, mid, and high level. During exposure time, the TGS signal is set to the mid-level. Because capacitor 630 has accumulated signal during exposure, double sampling can be performed by reading the SPD signal first, followed by readout of the SPD reset value. As another example, the read-out timing when different exposure times is used may include a reset of the SPD signal. With multiple exposure times, at time 652, the RST signal and TGL1-$n$ may be set high, with an additional reset between times 652 and 654 at which RST, TGS, and FDG signals are set high.

The different representations of the scene captured by the first data from the first group of sensor elements and the second data from the second group of sensor elements may be used to improve highlight regions of a representation of the scene whether the output image frame is an SDR or HDR representation. Highlight regions of an image may be overexposed due to an exposure time being adjusted to improve detail in a shadow region of the image. When a dynamic range of a scene exceeds the dynamic range of an image sensor, a shorter exposure time reduces the signal-to-noise ratio (SNR) of the captured image and a longer exposure time results in saturation and clamping of the highlight regions. Challenges with highlight regions are apparent in pictures with bright skies, in which the details are lost in the sky due to saturation of, and thus clamping of, pixel values in the highlight region. High dynamic range (HDR) image frames may reduce the appearance of clamping and saturation in highlight regions by having a larger dynamic range that may capture the dynamic range of the scene. Standard dynamic range (SDR) image frames, and in some embodiments HDR image frames, may be improved by adjusting a highlight region using the first data from the first group of sensor elements and the second data from the second group of sensor elements.

Figure 7:
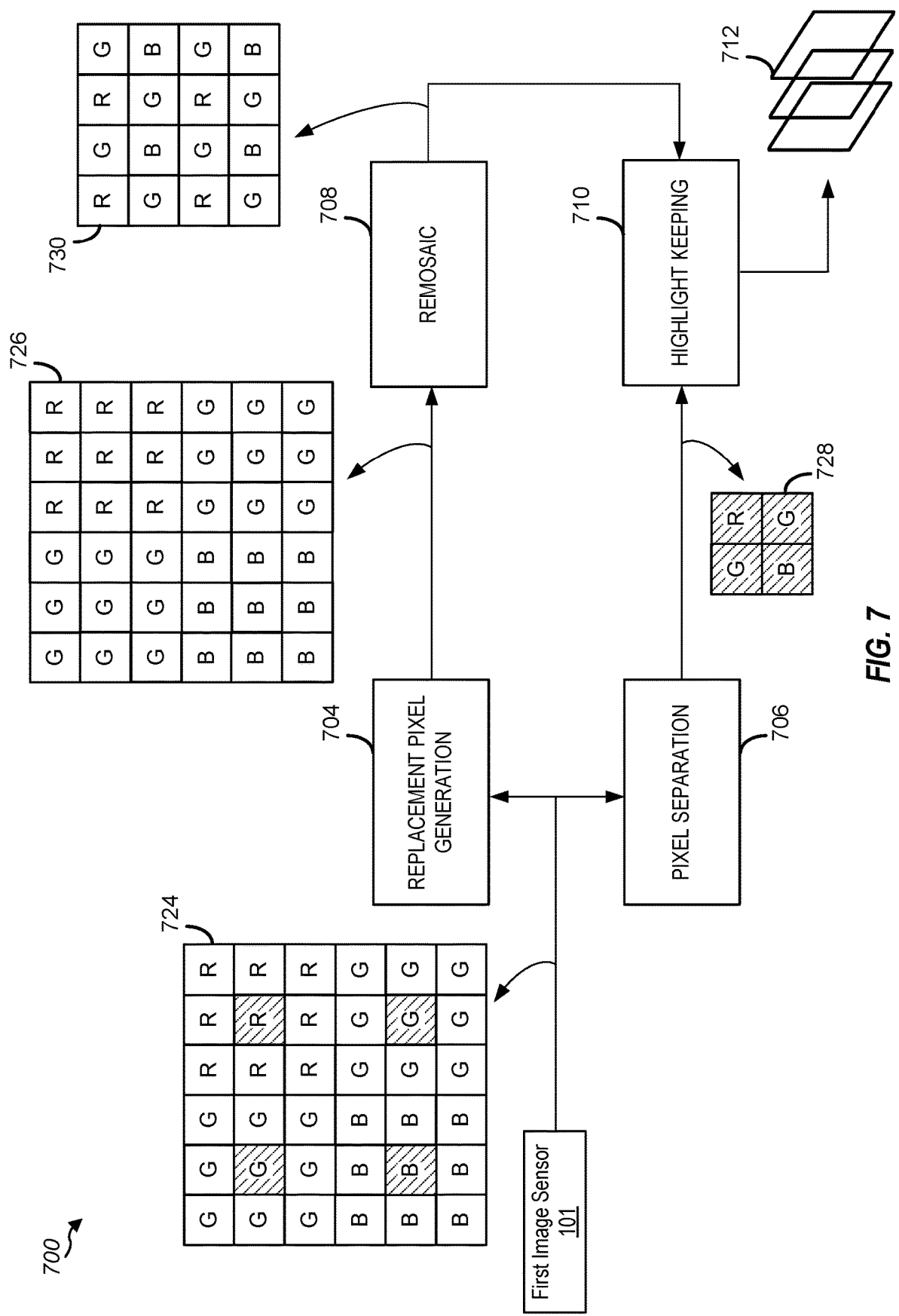
FIG. 7 shows a block diagram for image processing with highlight keeping with a 3×3 color filter array (CFA) pixel configuration according to some embodiments of the disclosure.

One technique for image processing with highlight keeping is illustrated in FIG. 7. FIG. 7 shows a block diagram for image processing with highlight keeping with a 3×3 color filter array (CFA) pixel configuration according to some embodiments of the disclosure. A processing path 700 begins with receiving data 724 from a first image sensor 101, such as a split-pixel image sensor. The data 724 may include raw values of first data for a first group of elements, such as the large pixel group, and second data for a second group of elements, such as the small pixel group. Processing of the first data through replacement pixel generation block 704 to generate image frame 726 and through remosaic block 708 to generate image frame 730 may be similar to processing path 432 of FIG. 4. The image frame 730 may be input to a highlight keeping block 710, which may reduce the appearance of clamped or saturation regions of the image frame 730. The highlight keeping block 710 may perform the highlight keeping using the second data, which may be separated by pixel separation block 706 to generate image frame 728. The highlight keeping block 710 may modify highlight regions of the image frame 730 using data from image frame 728 to generate an output image frame, such as a photography, or a series 712 of output image frames, such as a video. The different sensitivity used to obtain the second data may result in additional detail present in the highlight regions within the image frame 728 that may be used to modify the image frame 730, such as by replacing certain values in the image frame 730 with values or scaled values from the image frame 728.

Figure 8:
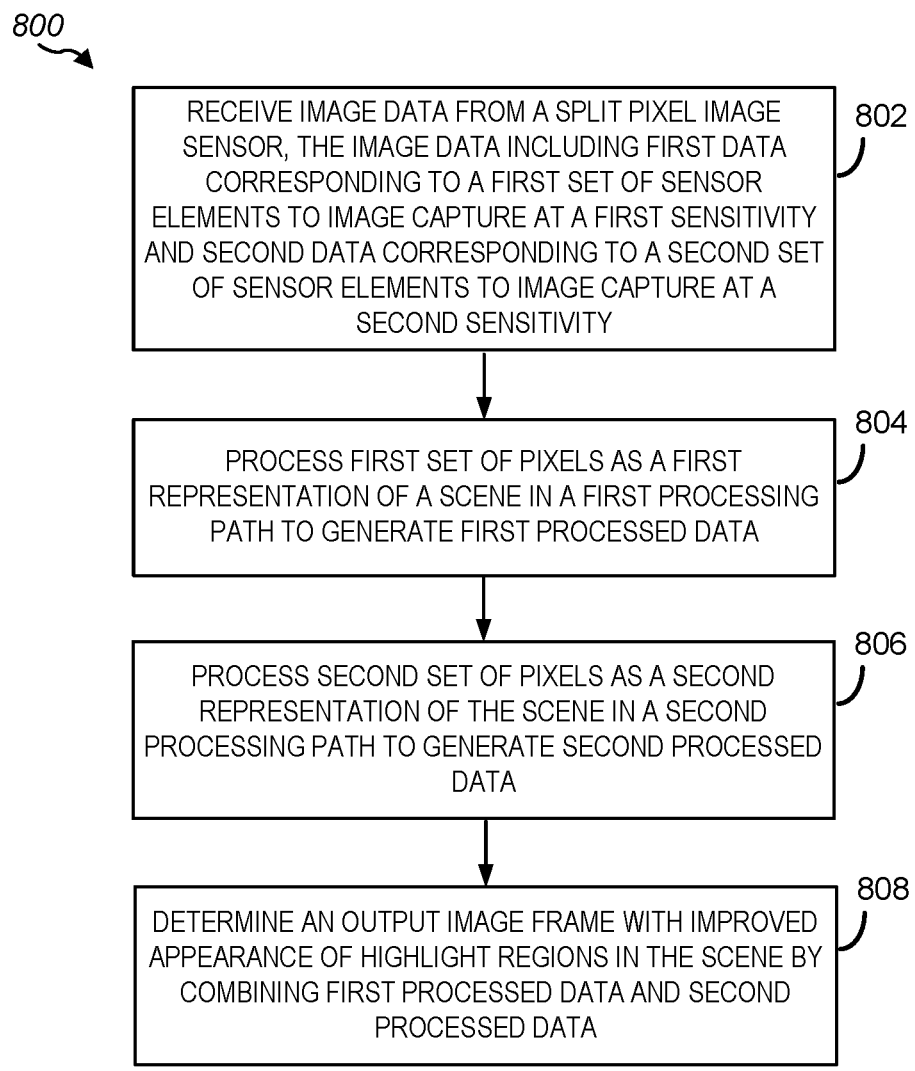
FIG. 8 shows a flow chart illustrating a method for highlight keeping with a split-pixel image sensor according to some embodiments of the disclosure.

A method for highlight keeping using first data and second data is illustrated in FIG. 8. FIG. 8 shows a flow chart illustrating a method for highlight keeping with a split-pixel image sensor according to some embodiments of the disclosure. A method 800 includes, at block 802, receiving image data, the image data including first data corresponding to a first set of sensor elements capturing a first representation of a scene with a first sensitivity. The image data may also include second data corresponding to a second set of sensor elements capturing a second representation of the scene with a second sensitivity different from the first sensitivity of the first set of sensor elements. For example, the second set of sensor elements may have neutral density filters, different capacitances, and/or different exposure times. In some embodiments, the first data and the second data may be captured in parallel from one image sensor. In some embodiments, the image data is received from a split-pixel image sensor with a color filter array (CFA) configuration such as shown in FIGS. 3A-3D.

At block 804, a first set of pixels may be processed as a first representation of a scene in a first processing path to generate first processed data. For example, with reference to FIG. 7, a first set of pixels from data 724 may be processed through a first processing path, such as blocks 704 and 708, to generate first processed data, represented as image frame 730.

At block 806, a second set of pixels may be processed as a second representation of the scene in a second processing path to generate second processed data. For example, with reference to FIG. 7, a second set of pixels from data 724 may be processed through a second processing path, such as block 706, to generate second processed data, represented as image frame 728.

At block 808, an output image frame may be determined with improved appearance of highlight regions in the scene by combining the first processed data with the second processed data. The processed data from blocks 804 and 806 may have different representations of the scene with different light sensitivities, such that highlight regions in the first processed data that are clamped or saturated are not clamped or saturated in the second processed data. The output image frame determined at block 808 may use portions of the second processed data to modify, such as by replacing, portions of the first processed data to keep details within highlight regions of the first processed data. In some embodiments, the output image frame of block 808 may be a high dynamic range (HDR) image frame. In some embodiments, the output image frame of block 808 may be a standard dynamic range (SDR) image frame. Example algorithms for the highlight keeping used in determining the output image frame of block 808 are described with reference to FIG. 9A and FIG. 9B.

Figure 9A:
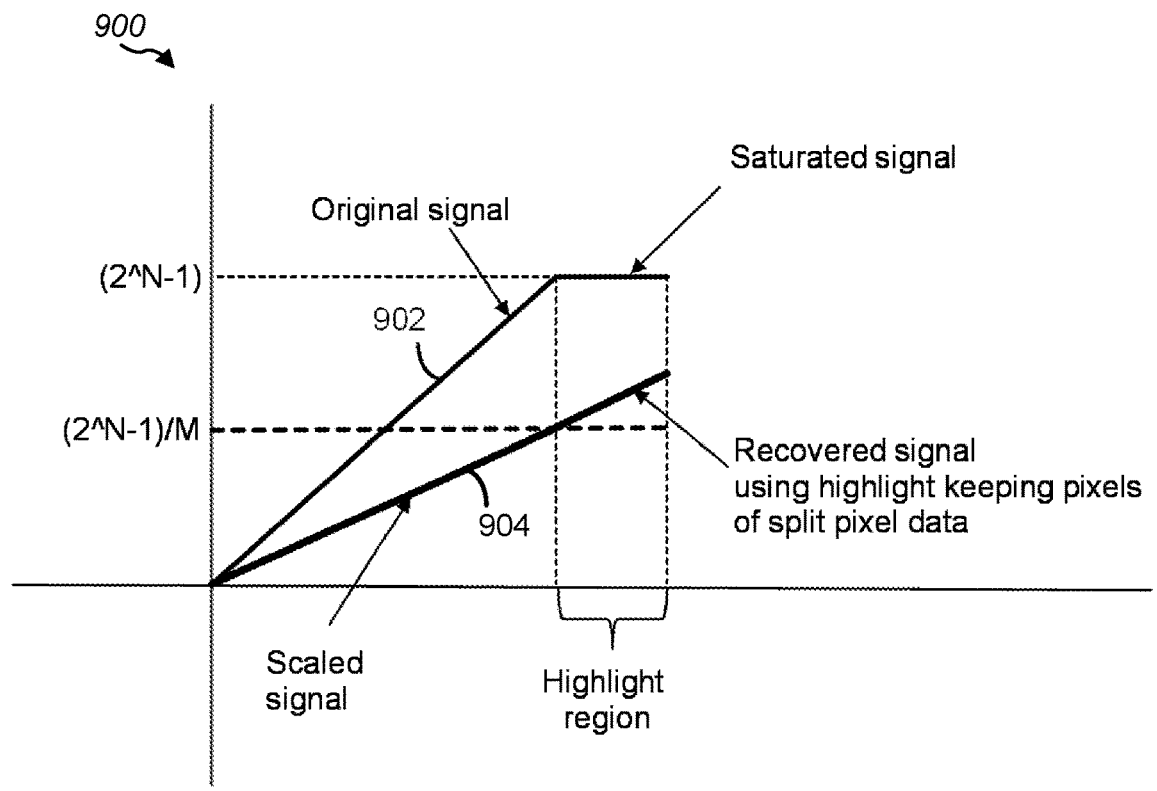
FIG. 9A shows a graph illustrating an image processing technique for highlight keeping according to some embodiments of the disclosure.

One example highlight-keeping algorithm maintains a bit width of an image as in the example embodiment of FIG. 9A. FIG. 9A shows a graph illustrating an image processing technique for highlight keeping according to some embodiments of the disclosure. An original signal 902 from a first set of sensor elements, such as a large pixel group, may saturate in a highlight region. The saturation in the highlight region results in clamping of raw values from the sensor elements to a value of $2^N-1$, wherein N is a sensor bit width (e.g., 10 bits or 12 bits). The raw values of the original signal 902 may be adjusted to a scaled signal 904, in which the clamping value for the scaled signal 904 is $(2^N-1)/M$, wherein M is a scale ratio (e.g., 1.5, 2, 3, 4, etc.). The scale ratio M may be based on a ratio of the sensitivity between the two sets of sensor elements or the equivalent exposure time of the signals captured from the two sets of sensor elements. The scale ratio M may be a scaling ratio sufficient such that combination of original signal from first data outside the highlight regions and highlight regions of second data are representable in a certain sensor bit width, such as the bit width of the original signal 902. The highlight region of the scaled signal 904 may be adjusted based on raw values from a second set of sensor elements, such as a small pixel group. A different sensitivity of the second set of sensor elements allows the second set of sensor elements to maintain detail in the highlight region. The adjusted scaled signal 904 shown in FIG. 9A has improved detail over the original signal 902 based on the benefit of two representations of the scene based on two different sensitivities. In this embodiment, sensor output bit width is unchanged because the maximum value of the scaled signal 904 remains below the maximum value of the original signal 902. The scene representation based on scaled signal 904 may be darker than when based on the original signal 902. In some embodiments, a tone mapping algorithm may be applied to the scaled signal 904 to adjust the tone curve based on the scale ratio to adjust image brightness to improve the appearance of the image.

Figure 9B:
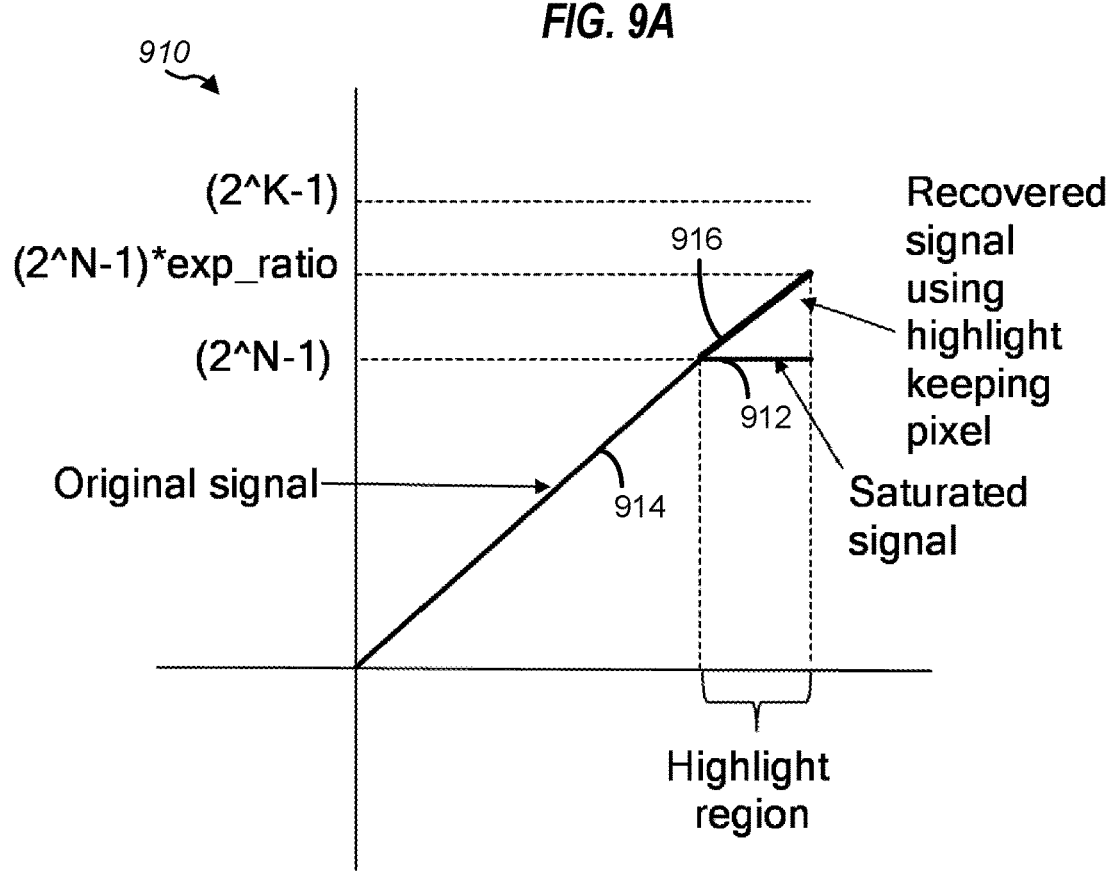
FIG. 9B shows a graph illustrating an image processing technique for highlight keeping according to some embodiments of the disclosure.

One example highlight-keeping algorithm increases a bit width of an image as in the example embodiment of FIG. 9B. FIG. 9B shows a graph illustrating an image processing technique for highlight keeping according to some embodiments of the disclosure. An original signal 914 from a first set of sensor elements, such as a large pixel group, may saturate 912 in a highlight region. The saturation in the highlight region results in clamping of raw values from the sensor elements to a value of $2^N-1$, wherein N is a sensor bit width (e.g., 10 bits or 12 bits) of the original signal 914. The highlight region of the original signal 914 may be adjusted, such as by being replaced, based on raw values from a second set of sensor elements, such as a small pixel group. A different sensitivity of the second set of sensor elements allows the second set of sensor elements to improve detail in the highlight region. The original signal 914 with recovered signal 916 in highlight region as shown in FIG. 9B has improved detail over the original signal 914 based on the benefit of two representations of the scene based on two different sensitivities. The resulting signal may be part of an HDR image frame with a bit width that is greater than the bit width of the original signal 914. The range of values, and corresponding bit width, for the original signal 914 with adjusted highlight region using recovered signal 916 is $2^K-1$, wherein K is a bit width after HDR fusion.

It is noted that one or more blocks (or operations) described with reference to FIGS. 4, 5, 6B, 7, and/or 8 may be combined with one or more blocks (or operations) described with reference to another of the figures. For example, one or more blocks (or operations) of FIG. 4 may be combined with one or more blocks (or operations) of FIG. 7. As another example, one or more blocks associated with FIG. 5 may be combined with one or more blocks associated with FIG. 8. As another example, one or more blocks associated with FIGS. 4, 5, 6B, 7, and/or 8 may be combined with one or more blocks (or operations) associated with FIGS. 1, 2, and/or 6A.

In one or more aspects, techniques for supporting image processing may include additional aspects, such as any single aspect or any combination of aspects described below or in connection with one or more other processes or devices described elsewhere herein. In a first aspect, supporting image processing may include an apparatus configured to capture and/or process image data, such as in an image capture device. The apparatus may include a split-pixel image sensor according to one or more embodiments described herein. Additionally, the apparatus may perform or operate according to one or more aspects as described below. For example, the apparatus may perform steps comprising receiving image data, the image data including first data corresponding to a first set of sensor elements capturing a first representation of a scene with a first sensitivity, and second data corresponding to a second set of sensor elements capturing a second representation of the scene with a second sensitivity different from the first sensitivity. In some aspects, such as in combination with one or more aspects described below, the first data and the second data were captured in parallel from one image sensor. In some aspects, the first data and the second data comprise values in a color pattern, such as a color filter array (CFA) that is larger than a Bayer pattern, with examples of such CFAs being a 2×2 CFA, 3×3 CFA, 4×4 CFA, 5×5 CFA, 6×6 CFA, 7×7 CFA, 8×8 CFA, or N×N CFA. In some aspects, each of the first set and the second set of sensor elements may have the same sizes, such that the first set and the second set form a uniform array of sensor elements with the same surface area exposed for collecting light. In some aspects, the apparatus may further include determining an output dynamic range for an output image frame; and determining an output image frame based on at least one of the first data and the second data and based on the determined output dynamic range. In some implementations, the apparatus includes a wireless device, such as a user equipment (UE) or a base station (BS). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of image processing may include one or more operations described herein with reference to the apparatus.

In a second aspect, in combination with the first aspect, the first set of sensor elements is associated with a neutral density (ND) filter configured to reduce incoming light to the first set of sensor elements.

In a third aspect, in combination with one or more of the first aspect or the second aspect, the first set of sensor elements is associated with a first capacitance that is larger than a second capacitance associated with the second set of sensor elements.

In a fourth aspect, in combination with one or more of the first aspect through the third aspect, the second set of sensor elements captured the second data with a second exposure time different from a first exposure time of the first set of sensor elements for capturing the first data.

In a fifth aspect, in combination with one or more of the first aspect through the fourth aspect, determining the output image frame comprises combining first data with corresponding second data to generate the output image frame with the output dynamic range, wherein the output dynamic range is higher than a first dynamic range of the first data and is higher than a second dynamic range of the second data.

In a sixth aspect, in combination with one or more of the first aspect through the fifth aspect, determining the output image frame comprises: generating replacement data corresponding to the second set of sensor elements based on the first data; and determining third data based on combining the first data and the replacement data, wherein the output image frame is based on the third data.

In a seventh aspect, in combination with one or more of the first aspect through the sixth aspect, determining the output image frame further comprises: modifying highlight regions in the third data based on the second data.

In an eighth aspect, in combination with one or more of the first aspect through the seventh aspect, modifying highlight regions in the third data comprises: determining scaled third data based on the second data such that third data outside the highlight regions and second data inside the highlight regions is representable in a sensor bit width of the third data; and replacing highlight regions of the scaled third data with corresponding portions of the second data.

In a ninth aspect, in combination with one or more of the first aspect through the eighth aspect, modifying highlight regions in the third data comprises: replacing highlight regions of the third data with corresponding portions of the second data.

In a tenth aspect, in combination with one or more of the first aspect through the ninth aspect, receiving first data comprises reading out the first set of sensor elements through a first floating node; and wherein receiving second data comprises reading out the second set of sensor elements through a second floating node.

In an eleventh aspect, in combination with one or more of the first aspect through the tenth aspect, the apparatus further includes an image sensor comprising the first set of sensor elements and the second set of sensor elements, wherein the first set of sensor elements and the second set of sensor elements comprise the uniform array of sensor elements representing the color pattern of a color filter array (CFA) larger than a Bayer pattern.

In one or more aspects, techniques for supporting image processing may include additional aspects, such as any single aspect or any combination of aspects described below or in connection with one or more other processes or devices described elsewhere herein. In a twelfth aspect, supporting image processing may include an apparatus having an image sensor comprising a first set of sensor elements and a second set of sensor elements, wherein the first set of sensor elements and the second set of sensor elements comprise a uniform array of sensor elements representing a color pattern of a color filter array (CFA) larger than a Bayer pattern; a memory storing processor-readable code and coupled to the image sensor; and at least one processor coupled to the memory and coupled to the image sensor. The at least one processor may be configured to execute the processor-readable code to cause the at least one processor to perform steps including recording into the memory first data and second data captured from the image sensor during at least partially overlapping times, the first data from the first set of sensor elements capturing a first representation of a scene with a first sensitivity and the second data from the second set of sensor elements capturing a second representation of the scene with a second sensitivity different from the first sensitivity; determining an output dynamic range for an output image frame; and determining an output image frame based on the output dynamic range and based on at least one of the first data and the second data.

In a thirteenth aspect, in combination with one or more of the first aspect through the twelfth aspect, the apparatus further includes a neutral density filter coupled to the second set of sensor elements.

In a fourteenth aspect, in combination with one or more of the first aspect through the thirteenth aspect, the apparatus further includes the image sensor comprises: a first floating node coupled to the first set of sensor elements; a second floating node coupled to the second set of sensor elements; and a configurable path coupling the first floating node and the second floating node.

In a fifteenth aspect, in combination with one or more of the first aspect through the fourteenth aspect, recording the first data and the second data into the memory comprises: controlling the configurable path to record the first data through the first floating node; and controlling the configurable path to record the second data through the second floating node.

In a sixteenth aspect, in combination with one or more of the first aspect through the fifteenth aspect, the image sensor comprises a capacitor coupled between the second floating node and the second set of sensor elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
receiving first data corresponding to a scene captured at a first sensitivity, the first data captured by a first set of sensor elements;
receiving second data corresponding to the scene captured at a second sensitivity, the second data captured by a second set of sensor elements, wherein the first set of sensor elements and the second set of sensor elements form a uniform array of sensor elements that filter through different respective colors and that are arranged in a color pattern comprising a color filter array (CFA) larger than a Bayer pattern;
determining an output dynamic range for an output image frame; and
determining the output image frame based on the output dynamic range and at least one of the first data and the second data;
wherein each of the sensor elements of the first set of sensor elements has a lower light sensitivity than each of the sensor elements of the second set of sensor elements, the first set of sensor elements are interspersed among the second set of sensor elements, and the determining of the output image frame includes generating a first intermediate frame in the Bayer pattern using the first data, generating a second intermediate frame in the color pattern using the second data, remosaicing the second intermediate frame to generate a third intermediate frame in the Bayer pattern, and generating the output image frame using the first and third intermediate frames.

2. The method of claim 1, wherein the first set of sensor elements is associated with a neutral density (ND) filter configured to reduce incoming light to the first set of sensor elements.

3. The method of claim 1, wherein the first set of sensor elements is associated with a first capacitance that is larger than a second capacitance associated with the second set of sensor elements.

4. The method of claim 1, wherein the second set of sensor elements captured the second data with a second exposure time different from a first exposure time of the first set of sensor elements for capturing the first data.

5. The method of claim 1, wherein the determining of the output image frame comprises combining the first data with the second data to generate the output image frame with the output dynamic range, wherein the output dynamic range is higher than a first dynamic range of the first data and is higher than a second dynamic range of the second data.

6. The method of claim 1, wherein the determining of the output image frame comprises:
   generating replacement data corresponding to the first set of sensor elements based on the second data; and
   determining third data based on combining the second data and the replacement data, wherein the output image frame is based on the third data.

7. The method of claim 6, wherein the determining of the output image frame further comprises:
   modifying highlight regions in the third data based on the first data.

8. The method of claim 7, wherein the modifying the highlight regions in the third data comprises:
   determining scaled third data based on the first data such that third data outside the highlight regions and first data inside the highlight regions is representable in a sensor bit width of the third data; and
   replacing highlight regions of the scaled third data with corresponding portions of the first data.

9. The method of claim 7, wherein the modifying of the highlight regions in the third data comprises:
   replacing highlight regions of the third data with corresponding portions of the first data.

10. The method of claim 1, wherein the receiving of the first and second data comprises:
    reading out the first set of sensor elements through a first floating node; and
    reading out the second set of sensor elements through a second floating node.

11. An apparatus, comprising:
    at least one processor; and
    a memory to which the at least one processor is coupled and storing processor-readable code (a) that is executable by the at least one processor and (b) that, when executed by the at least one processor, causes the at least one processor to perform steps comprising:
    receiving first data corresponding to a scene captured at a first sensitivity, the first data captured by a first set of sensor elements;
    receiving second data corresponding to the scene captured at a second sensitivity, the second data captured by a second set of sensor elements, wherein the first set of sensor elements and the second set of sensor elements form a uniform array of sensor elements that filter through different respective colors and that are arranged in a color pattern comprising a color filter array (CFA) larger than a Bayer pattern;
    determining an output dynamic range for an output image frame; and
    determining the output image frame based on the output dynamic range and at least one of the first data and the second data,
    wherein each of the sensor elements of the first set of sensor elements has a lower light sensitivity than each of the sensor elements of the second set of sensor elements, the first set of sensor elements are interspersed among the second set of sensor elements, and the determining of the output image frame includes generating a first intermediate frame in the Bayer pattern using the first data, generating a second intermediate frame in the color pattern using the second data, remosaicing the second intermediate frame to generate a third intermediate frame in the Bayer pattern, and generating the output image frame using the first and third intermediate frames.

12. The apparatus of claim 11, wherein the first set of sensor elements is associated with a neutral density (ND) filter configured to reduce incoming light to the first set of sensor elements.

13. The apparatus of claim 11, wherein the first set of sensor elements is associated with a first capacitance that is larger than a second capacitance associated with the second set of sensor elements.

14. The apparatus of claim 11, wherein the second set of sensor elements captured the second data with a second exposure time different from a first exposure time of the first set of sensor elements for capturing the first data.

15. The apparatus of claim 11, wherein the determining of the output image frame comprises combining the first data with the second data to generate the output image frame with the output dynamic range, wherein the output dynamic range is higher than a first dynamic range of the first data and is higher than a second dynamic range of the second data.

16. The apparatus of claim 11, wherein the determining of the output image frame comprises:
    generating replacement data corresponding to the first set of sensor elements based on the second data; and
    determining third data based on combining the second data and the replacement data, wherein the output image frame is based on the third data.

17. The apparatus of claim 16, wherein the determining of the output image frame further comprises:
    modifying highlight regions in the third data based on the first data.

18. The apparatus of claim 17, wherein the modifying the highlight regions in the third data comprises:
    determining scaled third data based on the first data such that third data outside the highlight regions and first data inside the highlight regions is representable in a sensor bit width of the third data; and
    replacing highlight regions of the scaled third data with corresponding portions of the first data.

19. The apparatus of claim 17, wherein the modifying of the highlight regions in the third data comprises:
    replacing highlight regions of the third data with corresponding portions of the first data.

20. The apparatus of claim 11, wherein:
    the receiving of the first data comprises reading out the first set of sensor elements through a first floating node; and
    the receiving of the second data comprises reading out the second set of sensor elements through a second floating node.

21. The apparatus of claim 11, further comprising an image sensor comprising the first set of sensor elements and the second set of sensor elements.

22. An apparatus, comprising:
    an image sensor comprising a first set of sensor elements and a second set of sensor elements, wherein the first set of sensor elements and the second set of sensor elements comprise a uniform array of sensor elements representing a color pattern of a color filter array (CFA) larger than a Bayer pattern, wherein each of the sensor elements of the first set is completely surrounded by other of the sensor elements;
    at least one processor coupled to the image sensor; and
    a memory to which the at least one processor is coupled and storing processor-readable code (a) that is executable by the at least one processor and (b) that, when executed by the at least one processor, causes the at least one processor to perform steps comprising:

recording, into the memory, first data and second data captured from the image sensor during at least partially overlapping times, the first data from the first set of sensor elements capturing a first representation of a scene with a first sensitivity and the second data from the second set of sensor elements capturing a second representation of the scene with a second sensitivity different from the first sensitivity;

determining an output dynamic range for an output image frame; and determining the output image frame based on the output dynamic range and based on at least one of the first data and the second data, wherein each of the sensor elements of the first set of sensor elements has a lower light sensitivity than each of the sensor elements of the second set of sensor elements, the first set of sensor elements are interspersed among the second set of sensor elements, and the determining of the output image frame includes generating a first intermediate frame in the Bayer pattern using the first data, generating a second intermediate frame in the color pattern using the second data, remosaicing the second intermediate frame to generate a third intermediate frame in the Bayer pattern, and generating the output image frame using the first and third intermediate frames.

23. The apparatus of claim 22, further comprising a neutral density filter coupled to the second set of sensor elements.

24. The apparatus of claim 22, wherein the image sensor comprises:
a first floating node coupled to the first set of sensor elements;
a second floating node coupled to the second set of sensor elements; and
a configurable path coupling the first floating node and the second floating node.

25. The apparatus of claim 24, wherein recording the first data and the second data into the memory comprises:
controlling the configurable path to record the first data through the first floating node; and
controlling the configurable path to record the second data through the second floating node.

26. The apparatus of claim 24, wherein the image sensor comprises a capacitor coupled between the first floating node and the first set of sensor elements.

27. A non-transitory computer-readable medium storing instructions that, when executed by a processor, cause the processor to perform operations comprising:
receiving first data corresponding to a scene captured at a first sensitivity, the first data captured by a first set of sensor elements;

receiving second data corresponding to the scene captured at a second sensitivity, the second data captured by a second set of sensor elements, wherein the first set of sensor elements and the second set of sensor elements form a uniform array of sensor elements that filter through different respective colors and that are arranged in a color pattern comprising a color filter array (CFA) larger than a Bayer pattern;

determining an output dynamic range for an output image frame; and determining the output image frame based on the output dynamic range and at least one of the first data and the second data, wherein each of the sensor elements of the first set of sensor elements has a lower light sensitivity than each of the sensor elements of the second set of sensor elements, the first set of sensor elements are interspersed among the second set of sensor elements, and the determining of the output image frame includes generating a first intermediate frame in the Bayer pattern using the first data, generating a second intermediate frame in the color pattern using the second data, remosaicing the second intermediate frame to generate a third intermediate frame in the Bayer pattern, and generating the output image frame using the first and third intermediate frames.

28. The non-transitory computer-readable medium of claim 27, wherein the determining of the output image frame comprises combining the first data with the second data to generate the output image frame with the output dynamic range, wherein the output dynamic range is higher than a first dynamic range of the first data and is higher than a second dynamic range of the second data.

29. The non-transitory computer-readable medium of claim 27, wherein the determining of the output image frame comprises:
generating replacement data corresponding to the first set of sensor elements based on the second data;
determining third data based on combining the second data and the replacement data, wherein the output image frame is based on the third data; and
modifying highlight regions in the third data based on the first data.

30. The non-transitory computer-readable medium of claim 29, wherein modifying highlight regions in the third data comprises:
determining scaled third data based on the first data such that third data outside the highlight regions and first data inside the highlight regions is representable in a sensor bit width of the third data; and
replacing highlight regions of the scaled third data with corresponding portions of the first data.

* * * * *